United States Patent [19]

Ishii et al.

[11] Patent Number: 4,528,115
[45] Date of Patent: Jul. 9, 1985

[54] LIQUID CRYSTAL COMPOSITION AND LIQUID CRYSTAL DISPLAY DEVICE

[75] Inventors: Yutaka Ishii, Nara; Shigehiro Minezaki, Ikoma; Shuichi Kozaki, Nara; Fumiaki Funada, Yamato-Koriyama, all of Japan

[73] Assignee: Sharp Kabushiki Kaisha, Osaka, Japan

[21] Appl. No.: 490,713

[22] Filed: May 2, 1983

[30] Foreign Application Priority Data

Apr. 30, 1982 [JP] Japan .................................. 57-74429

[51] Int. Cl.³ .............................. G02F 1/13; C09K 3/34
[52] U.S. Cl. ............................. 252/299.63; 252/299.5; 252/299.67; 350/350 R; 350/332; 350/333
[58] Field of Search ........... 252/299.63, 299.5, 299.67; 350/350 R, 332, 333

[56] References Cited

U.S. PATENT DOCUMENTS

| 4,154,697 | 5/1979 | Eidenschink et al. | 252/299.63 |
| 4,229,315 | 10/1980 | Krause et al. | 252/299.63 |
| 4,330,426 | 5/1982 | Eidenschink et al. | 252/299.63 |
| 4,331,552 | 5/1982 | Eidenschink et al. | 252/299.63 |
| 4,340,498 | 7/1982 | Sugimori | 252/299.5 |
| 4,372,871 | 2/1983 | Toriyama et al. | 252/299.63 |
| 4,410,445 | 10/1983 | Baur et al. | 252/299.5 |
| 4,415,470 | 11/1983 | Eidenschink et al. | 252/299.6 |
| 4,422,951 | 12/1983 | Sugimori et al. | 252/299.5 |

FOREIGN PATENT DOCUMENTS

| 60646 | 9/1982 | European Pat. Off. | 252/299.63 |
| 2636684 | 2/1978 | Fed. Rep. of Germany | 252/299.63 |
| 3211601 | 10/1983 | Fed. Rep. of Germany | 252/299.63 |
| 56-2371 | 1/1981 | Japan | 252/299.63 |
| 56-2370 | 1/1981 | Japan | 252/299.63 |
| 57-34176 | 2/1982 | Japan | 252/299.63 |
| 2031010 | 4/1980 | United Kingdom | 252/299.63 |
| 2101626 | 1/1983 | United Kingdom | 252/299.63 |
| 2102017 | 1/1983 | United Kingdom | 252/299.63 |

Primary Examiner—Teddy S. Gron
Attorney, Agent, or Firm—Hubbell, Cohen Stiefel & Gross

[57] ABSTRACT

A liquid crystal composition comprising a mixed phase of the six kinds of the compounds such as

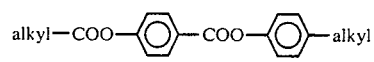

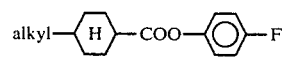

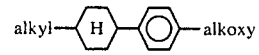

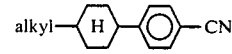

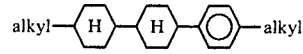

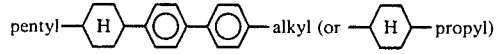

and a liquid crystal display device of the multiplex drive type such as liquid crystal television device, which uses the above composition.

9 Claims, 9 Drawing Figures

LIQUID CRYSTAL COMPOSITION AND LIQUID CRYSTAL DISPLAY DEVICE

BACKGROUND OF THE INVENTION

1. Field of the Invention

This invention relates to a liquid crystal composition, particularly to a liquid crystal composition suitable for use in twisted nematic (TN) liquid crystal display devices of the multiplex drive type, and to a liquid crystal display device using the liquid crystal composition mentioned above.

2. Description of the Prior Art

Recently, the liquid crystal display devices have been desired to possess larger capacities for the information to be displayed. The demand for liquid crystal display devices, therefore, has been gradually shifting from those of the segment display type to those of the matrix display type. For the matrix type display device to enjoy addition to its capacity for the information to be displayed, however, it is inevitably required to increase the capacity of the so-called multiplex drive. Unfortunately, such addition to the capacity entails decline of display contrast, decrease in the range of visual angle, and degradation of response characteristics.

First, as a measure to preclude the decline of display contrast, display characteristics of the liquid crystal display devices above the threshold voltage should be sharply changed. To provide an increase in the sharpness, the liquid crystal composition is required to possess as low elastic constant ratio, $k_{33}/k_{11}$ (wherein $k_{11}$ stands for splay and $k_{33}$ for bend), as possible and as low dielectric anisotropy, $\Delta\epsilon(\Delta\epsilon=\epsilon_{\parallel}-\epsilon_{\perp}$; wherein $\epsilon_{\perp}$ stands for the dielectric constant in the direction of long axis of molecule and $\epsilon_{\perp}$ for the dielectric constant in the direction of short axis of molecule) as possible.

Then, as a measure to curb the decrease in the range of visual angle, it is necessary that the liquid crystal composition should possess as low birefringence, $\Delta n$, as possible.

If the birefringence, $\Delta n$, is lowered more than is necessary, however, the incident beam of light is not bent and is caused to pass through the liquid crystal display device, with the results of the coloration and the poor contrast. So, the display quality of the liquid crystal display device is seriously impaired. The birefringence, $\Delta n$, of the liquid crystal composition, therefore, should be fixed with due consideration to the adaptability of the anisotropy to the optical conditions of the display device.

The response and recovery times of the liquid crystal display devices are directly proportional to the magnitude of the viscosity, $\eta$, of the material for liquid crystal. To enhance the response characteristic of the liquid crystal display device, therefore, it is necessary that the liquid crystal composition should possess as low a viscosity as possible.

It is desirable to produce a liquid crystal composition which satisfies the requirements mentioned above and, at the same time, exhibits an ample range of liquid crystal temperature.

The liquid crystal compositions which are available in the market and which are known in the art to be suitable for use in liquid crystal display devices of the multiplex drive type are represented by those liquid crystals produced by Hoffmann-LaRoche & Co., Ltd. (such as RO-TN-200, -201, -211, -103, -132, -403, and -430) [cf. IEEE Trans. Elec. Devices, ED-25 (1978) 1125] and those liquid crystals made by BDH Chemicals Ltd. (such as E-90, -92, -94, -96, -98, -100, -102, -104, -106, -108, and -110) [cf. A leaflet of liquid crystal materials by BDH Chemicals Ltd. (UK), Feb. of 1981]. None of these known, commercially available liquid crystal compositions, however, fully satisfies all the requirements mentioned above.

As the results of various and extensive studies, we have discovered the liquid crystal composition usable for the matrix drive display device, by selecting and utilizing liquid crystal compounds possessing the following five properties, namely, low viscosity, high melting point, positive dielectric anisotropy, low birefringence, and low elastic constant ratio.

SUMMARY OF THE INVENTION

According to the present invention, there is provided a liquid crystal composition which is characterized by comprising a mixed phase of a compound of the general formula:

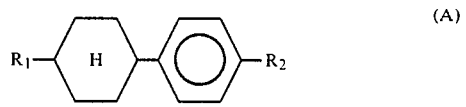

(A)

(wherein $R_1$ is a saturated linear hydrocarbon group having 3 to 7 carbon atoms and $R_2$ is an ethoxy group, a propoxy group, or a butoxy group), a compound of the general formula:

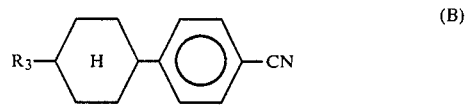

(B)

(wherein $R_3$ is a saturated linear hydrocarbon group having 2 to 7 carbon atoms), a compound of the general formula:

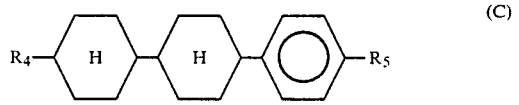

(C)

(wherein $R_4$ is a saturated linear hydrocarbon group having 2 to 5 carbon atoms and $R_5$ is a saturated linear hydrocarbon group having 1 to 3 carbon atoms), a compound of the general formula:

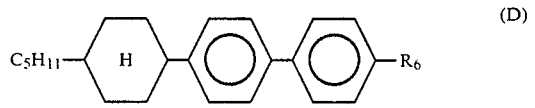

(D)

(wherein $R_6$ is an ethyl group or a group of the formula

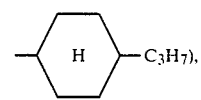

a compound of the general formula:

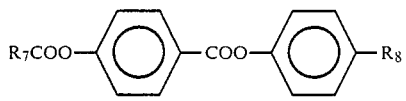

(E)

(wherein $R_7$ is a saturated linear hydrocarbon group having 4 to 6 carbon atoms and $R_8$ is a saturated linear hydrocarbon group having 3 to 7 carbon atoms), and a compound of the general formula:

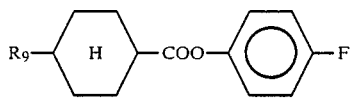

(F)

(wherein $R_9$ is a saturated linear hydrocarbon group having 4 to 8 carbon atoms).

In the liquid crystal composition described above, the compound of the general formula (E) is generally incorporated in an amount falling in the range of 15 to 25 w/w%. The compound of the general formula (F) is generally incorporated in practically the same amount as the compound of the general formula (E). The remaining compounds of the general formulas (A) through (D), inclusive, are incorporated in a total amount falling in the range of 50 to 70 w/w%. Of these four compounds of the general formulas (A) through (D), the compound of the general formula (A) and that of the formula (B) are incorporated each in an amount of not less than 10 w/w% and the two remaining compounds of the formulas (C) and (D) are incorporated in a total amount of not less than 10 w/w%.

DESCRIPTION OF THE PREFERRED EMBODIMENT

Of the compounds which jointly constitute the liquid crystal composition of the present invention, it is the diester compound represented by the general formula (E):

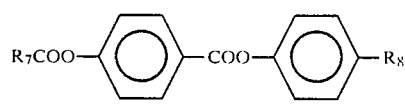

(E)

(wherein the symbols have the same meanings as described above) that prominently characterizes this liquid crystal composition. This compound is adopted herein to serve mainly as a compound having a low elastic constant ratio.

The desirability of the adoption of this compound will be described below with reference to a typical matrix type liquid crystal display device (TN panel) for which the liquid crystal composition of the present invention is used.

Figure 1:
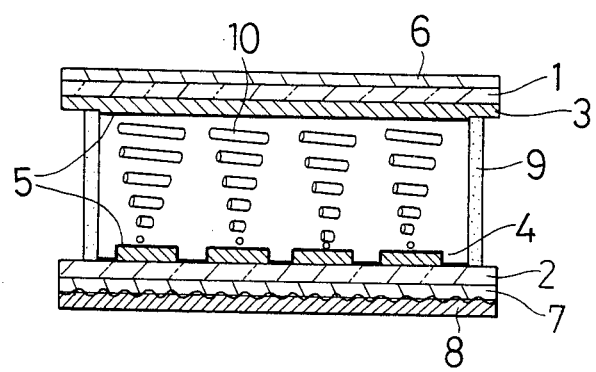
FIG. 1 is a cross section of a TN panel (liquid crystal display device) possessing a matrix electrode structure.

The TN panel illustrated in FIG. 1 comprises a first substrate 1 and a second substrate 2, which are each made of transparent glass and which are parallelly disposed as separated by a fixed interval as in the range of 4 to 12 μm, with their overall outer boundary sealed in with a sealing material 9 such as an adhesive agent or organic resin. Within the space thus formed, a liquid crystal composition 10 is sealed in as twisted by an angle of about 90°.

The aforementioned first substrate 1 and second substrate 2 have formed on the inner surfaces thereof transparent scanning electrodes 3 of the shape of a stripe arranged regularly in one direction and transparent signal electrodes 4 similarly of the shape of a stripe arranged regularly in a direction perpendicular to the one direction mentioned above, giving rise to a matrix structure. A surface 5 which is exposed directly to the liquid crystal 10 is formed by having $SiO_2$, for example, vacuum deposited on the substrate 2 supporting the signal electrodes 4 or the substrate 1 supporting the scanning electrodes 3, then coating the deposited layer of $SiO_2$ with an oriented organic film, and subjecting the coated layer to a rubbing treatment which consists in applying a rubbing motion in one fixed direction.

A polarizing plate 6 is superposed on the upper surface of the aforementioned first substrate 1 and a polarizing plate 7 and a reflecting plate 8 are superposed on the lower surface of the aforementioned second substrate 2. These polarizing plates 6, 7 are disposed with the optical axes thereof perpendicularly intersecting each other, so as to assume a normally open state.

Figure 2:
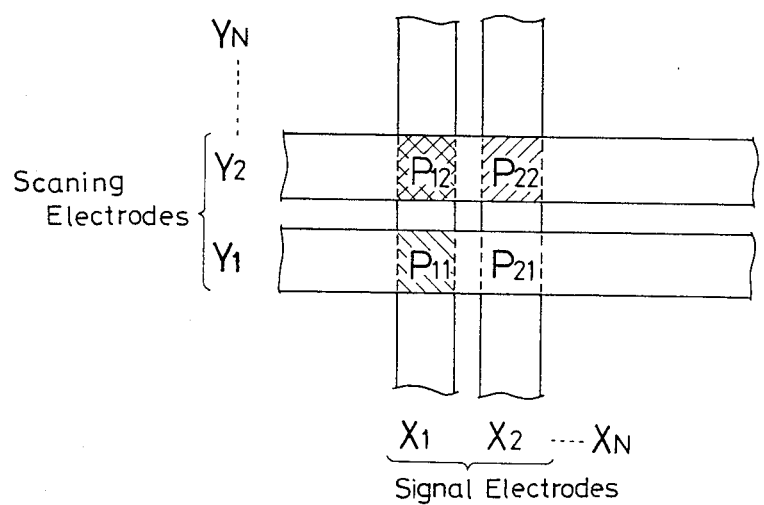
FIG. 2 is a diagram illustrating a state model of applied voltage in the amplitude-selecting method.
Figure 3:
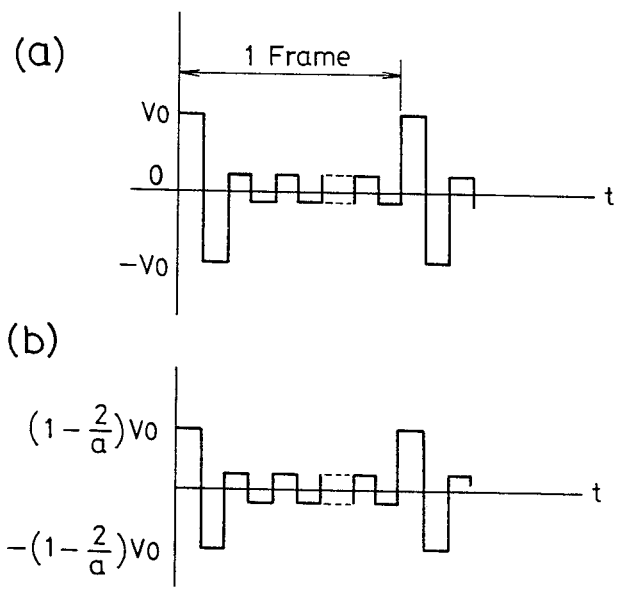
FIG. 3 is a diagram illustrating a drive waveform by the 1/a bias method.

A model of the state of voltage applied to liquid crystal in the amplitude-selecting method is illustrated in FIG. 2 and a drive waveform actually applied to liquid crystal by the 1/a bias method is illustrated in FIG. 3.

In FIG. 2, $P_{12}$ represents the state of total selection, $P_{11}$ and $P_{22}$ each represent the state of half selection, and $P_{21}$ represents the state of no selection. In FIG. 3, (a) represents the waveform of voltage applied to selected points and (b) represents the waveform of voltage applied to non-selected points.

Let N stand for the number of scanning electrodes and 1/a for the bias, and the value of effective voltage $V_S$ during selection and the value of effective voltage $V_{NS}$ during non-selection will be generally expressed as follows.

$$V_S = \frac{V_0}{a} \sqrt{\frac{a^2 + N - 1}{N}} \quad (1)$$

$$V_{NS} = \frac{V_0}{a} \sqrt{\frac{(a-2)^2 + N - 1}{N}} \quad (2)$$

wherein $V_0$ stands for drive voltage.

For the liquid crystal to provide display of good contrast, the optimum condition for maximizing the operational margin $\alpha(=V_S/V_{NS})$ will be derived from the foregoing formulas (1) and (2) as follows.

$$\alpha_{max} = \sqrt{\frac{\sqrt{N}+1}{\sqrt{N}-1}} \quad (3)$$

wherein $$a = \sqrt{N} + 1$$

The formula ③ indicates that the value of $\alpha_{max}$ approaches 1 as the number, N, of scanning electrodes increases. It is, therefore, essential that the TN panel should exhibit an abrupt characteristic at the threshold value. It has been ascertained that improvement for the sake of this requirement is obtained by the incorporation of the aforementioned diester compound (E) in the liquid crystal composition.

Since this diester compound has high viscosity, however, it fails to provide amply high response characteristic and adapt the birefringence, Δn, to the optical conditions of the liquid crystal display device. As the result of various experiments, it has been ascertained that the fluorine-containing ester compound of the general formuala (F) indicated below is highly effective in improving the viscosity and the birefringence, Δn, without impeding the sharpness of the electropic characteristic due to the aforementioned diester compound.

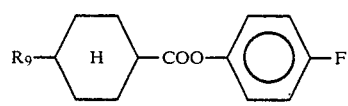
(F)

(wherein the symbol has the same meaning as described above).

Examples of the compound of the general formula (E) include the compounds shown in the following table.

| Structural formula | $T_{CN}$, $T_{CS}$ (°C.) | $T_{mp}$ (°C.) |
|---|---|---|
| $C_4H_9COO$—⌬—COO—◯—$C_6H_{13}$ | 45 | 46 |
| $C_5H_{11}COO$—⌬—COO—◯—$C_3H_7$ | 39 | 54 |
| $C_5H_{11}COO$—⌬—COO—◯—$C_4H_9$ | 39 | 49 |
| $C_5H_{11}COO$—⌬—COO—◯—$C_5H_{11}$ | 40 | 61 |
| $C_5H_{11}COO$—⌬—COO—◯—$C_6H_{13}$ | 38 | 54 |
| $C_5H_{11}COO$—⌬—COO—◯—$C_7H_{15}$ | 43 | 60 |
| $C_6H_{13}COO$—⌬—COO—◯—$C_6H_{13}$ | 45 | 55 |

Legend
$T_{CN}$: Crystal-nematic phase transition temperature
$T_{CS}$: Crystal-smectic phase transition temperature
$T_{mp}$: Melting point Examples of the compound of the general formula (F) include the compounds shown in the following table.

| Structural formula | $T_{CN}$, $T_{CS}$ (°C.) | $T_{mp}$ (°C.) |
|---|---|---|
| $C_4H_9$—⟨H⟩—COO—◯—F | 31 | — |
| $C_5H_{11}$—⟨H⟩—COO—◯—F | 26 | 23 |
| $C_6H_{13}$—⟨H⟩—COO—◯—F | 30 | 24 |
| $C_7H_{15}$—⟨H⟩—COO—◯—F | 29 | 33 |
| $C_8H_{17}$—⟨H⟩—COO—◯—F | 34 | 31 |

The compound of the aforementioned general formula (E) is incorporated in the composition of the present invention in an amount falling generally in the range of 15 to 25 w/w%, preferably in the range of 18 to 23 w/w%. The compound of the general formula (F) is incorporated in the composition in an amount falling generally in the range of 15 to 25 w/w%, preferably in the range of 18 to 23 w/w%. These two compounds of the general formulas (E), (F) constitute themselves main components of the composition of the present invention. The total amount of the two compounds accounts for 30 to 50 w/w% of the composition.

The liquid crystal composition of this invention further incorporates therein a nitrile compound of the general formula (B):

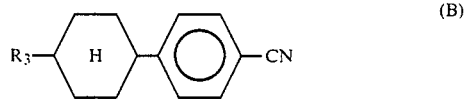
(B)

(wherein the symbol has the same meaning as described above). This compound is incorporated chiefly to serve as a compound possessing a positive value of the anisotropy, Δε. It is used for the purpose of contributing to lowering the threshold voltage of the TN panel. Besides, since the compound of the general formula (B) incidentally possesses low viscosity, it contributes advantageously to enhancing the response characteristic. The amount of the compound (B) to be incorporated in the composition is determined with a view solely to thorough manifestation of the aforementioned effects this compound is expected to bring about. Generally, it is incorporated in an amount of not less than 10 w/w%, suitably 15–30 w/w%, specifically in the neighborhood of 20 w/w%, for example, based on the amount of the composition.

Examples of the compound of the general formula (B) include the compounds shown in the following table.

| Structural formula | $T_{CN}$, $T_{CS}$ (°C.) | $T_{mp}$ (°C.) |
|---|---|---|
| $C_2H_5$—H—◯—CN | 40 | 4 |
| $C_3H_7$—H—◯—CN | 42 | 45 |
| $C_4H_9$—H—◯—CN | 41 | 41 |
| $C_5H_{11}$—H—◯—CN | 30 | 55 |
| $C_6H_{13}$—H—◯—CN | 42 | 47 |
| $C_7H_{15}$—H—◯—CN | 30 | 57 |

In the liquid crystal composition of the present invention, a phenyl cyclohexane compound of the general formula (A):

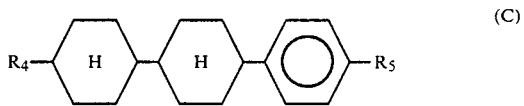

(A)

(wherein the symbols have the same meanings as described above) is also incorporated. This compound of the general formula (A) exhibits a very low value of viscosity, $\eta \approx 5 \sim 7$ cp and is used for the purpose of enhancing the response characteristic of the liquid crystal display device particularly at low temperatures. For this purpose, this compound is advantageously incorporated generally in an amount of not less than 10 w/w%, specifically in the range of 15 to 25 w/w%, for example, based on the amount of the composition. Examples of the compound of the general formula (A) include the compounds shown in the following table.

| Structural formula | $T_{CN}$, $T_{CS}$ (°C.) | $T_{mp}$ (°C.) |
|---|---|---|
| $C_3H_7$—H—◯—$OC_2H_5$ | — | 40 |
| $C_3H_7$—H—◯—$OC_4H_9$ | 32 | 36 |
| $C_4H_9$—H—◯—$OC_2H_5$ | — | 47 |
| $C_5H_{11}$—H—◯—$OC_2H_5$ | — | 51 |
| $C_6H_{13}$—H—◯—$OC_2H_5$ | 33 | 45 |
| $C_7H_{15}$—H—◯—$OC_2H_5$ | 53 | 53 |

Further, the liquid crystal composition of the present invention incorporates therein partially reduced oligophenylene compounds represented by the general formula (C):

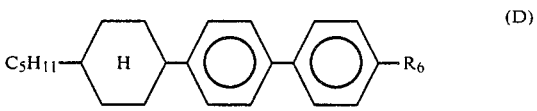

(C)

(wherein the symbols have the same meanings as described above) and the general formula (D):

$C_5H_{11}$—H—◯—◯—$R_6$ (D)

(wherein the symbol has the same meaning as described above).

Figure 6:
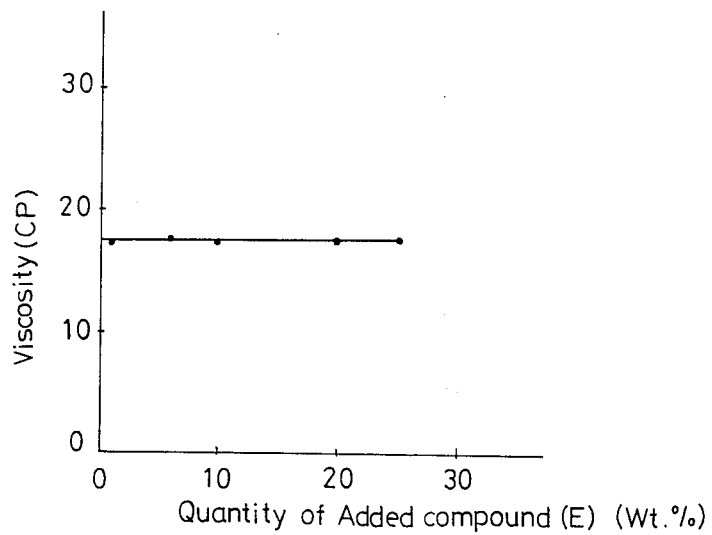
FIG. 6 is a diagram illustrating the relation between liquid crystal composition and viscosity, FIGS. 7 (a), (b) is a diagram illustrating an electrode structure combining the vertical electrode division method and the double-matrix electrode method.

These compounds have high melting points and are incorporated in the composition for the purpose of heightening the nematic-isotropic phase transition temperature ($T_{NI}$) and amply widening the liquid crystal temperature range of the liquid crystal composition. The fact that the compounds of such high melting points are used in combination is effective in thoroughly lowering the crystal-nematic (smectic) phase transition temperature ($T_{CN}$, $T_{CS}$). The incorporation of these compounds does not adversely affect the ideally low viscosity of the liquid crystal composition which additionally incorporates the other compounds of the general formulas (A), (B), (E), and (F). In the case of the compound of the general formula (E), for example, when a liquid crystal composition is prepared by incorporating the compound (E) in a mixed liquid crystal of 4-(trans-4-propylcyclohexyl)-benzonitrile, 4-(trans-4-pentylcyclohexyl)benzonitrile, and 4-(trans-4-heptylcyclohexyl)-benzonitrile, the variation in the amount of the compound (E) incorporated brings about substantially no change in the viscosity of the produced composition as illustrated in FIG. 6.

For the purpose mentioned above, the compounds of the general formulas (C) and (D) are incorporated in a total amount generally exceeding at least 10 w/w%, suitably 10-25 w/w%, preferably falling in the neighborhood of 20 w/w%.

Examples of the compound of the general formula (C) include the compounds shown in the following table.

| Structural formula | $T_{CN}$, $T_{CS}$ (°C.) | $T_{mp}$ (°C.) |
|---|---|---|
| C₃H₇—(H)—(H)—(O)—CH₃ | 65 | 179 |
| C₃H₇—(H)—(H)—(O)—C₂H₅ | 39 | 163 |
| C₃H₇—(H)—(H)—(O)—C₃H₇ | 21 | 178 |

Examples of the compound of the general formula (D) include the compounds shown in the following table.

| Structural formula | $T_{CN}$, $T_{CS}$ (°C.) | $T_{mp}$ (°C.) |
|---|---|---|
| C₃H₇—(H)—(O)—(O)—C₂H₅ | 66 | 166 |
| C₅H₁₁—(H)—(O)—(O)—C₂H₅ | 34 | 164 |
| C₅H₁₁—(H)—(O)—(O)—(H)—C₃H₇ | 55 | 311 |

The compounds of the general formulas (A) through (F) of which the liquid crystal composition of the present invention is composed have been described. Desirably, two or more compounds of any one of the general formulas described above may be used in the form of a mixture, instead of just one compound of that general formula, for incorporation into the liquid crystal composition of the present invention.

Now, the present invention will be described more specifically with reference to working examples cited herein below. It should be noted that the present invention is not limited in any respect by these examples.

EXAMPLE

Composition 1

| Liquid crystal composition | Percentage composition (wt %) |
|---|---|
| n-C₃H₇—(H)—(O)—OC₂H₅ | 8.8 |
| n-C₃H₇—(H)—(O)—O—n-C₄H₉ | 8.8 |
| n-C₃H₇—(H)—(O)—CN | 9.7 |
| n-C₅H₁₁—(H)—(O)—CN | 4.9 |
| n-C₃H₇—(H)—(H)—(O)—CH₃ | 4.9 |
| n-C₃H₇—(H)—(H)—(O)—C₂H₅ | 7.3 |
| n-C₅H₁₁—(H)—(O)—(O)—C₂H₅ | 8.2 |
| n-C₅H₁₁—(H)—(O)—(O)—(H)—n-C₃H₇ | 2.9 |
| n-C₅H₁₁COO—(O)—COO—(O)—n-C₃H₇ | 11.6 |
| n-C₅H₁₁COO—(O)—COO—(O)—n-C₇H₁₅ | 8.3 |
| n-C₅H₁₁—(H)—COO—(O)—F | 11.8 |
| n-C₇H₁₅—(H)—COO—(O)—F | 12.8 |

The compounds in the respective proportions shown in the preceding table were heated and stirred under normal atmospheric pressure until they formed a liquid crystal composition in the form of a clear solution. This liquid crystal composition showed nematic liquid crystal temperatures in a range of from −40° C. to 63° C.

An experimental liquid crystal cell was obtained by pouring this liquid crystal composition into a TN cell which had undergone a twist orientation treatment in advance and superposing two polarizing plates one each on the opposite surfaces of the TN cell, with the optical axes of the polarizing plates perpendicularly intersecting each other.

Since the birefringence, Δn, of the liquid crystal composition was fixed at a small value of 0.1 for the purpose of widening the visual angle, the thickness of the cell was fixed at 5.5 μm lest the cell should suffer from coloration.

The properties of the liquid crystal cell described above are compared in Table 1 with those of a liquid crystal cell using the conventional liquid crystal composition shown below.

| Liquid crystal composition | Percentage Composition (wt %) |
|---|---|
| C$_3$H$_7$—(H)—(O)—CN | 11.6 |
| C$_5$H$_{11}$—(H)—(O)—CN | 30.5 |
| C$_5$H$_{11}$—(O)—(O)—CN | 21.1 |
| C$_5$H$_{11}$—(H)—(O)—(O)—CN | 11.0 |
| C$_5$H$_{11}$—(O)—(O)—(O)—CN | 10.3 |
| C$_4$H$_9$—(H)—(O)—COO—(H)—C$_3$H$_7$ | 15.5 |

TABLE 1

| Item | Conventional example | Example of this invention |
|---|---|---|
| V°$_{90}$ | 1.78 V$_{r\cdot m\cdot s}$ | 2.27 V$_{r\cdot m\cdot s}$ |
| V°$_{10}$ | 2.53 V$_{r\cdot m\cdot s}$ | 3.21 V$_{r\cdot m\cdot s}$ |
| L$_r$* (response time) | 28 msec | 30 msec |
| L$_d$* (recovery time) | 107 msec | 69 msec |
| Δε | 11.0 | 3.3 |
| $\gamma^{15°,\ 50\%}_{45°,\ 90\%}$ | 1.38 | 1.26 |
| Δn | 0.16 | 0.10 |
| T$_{CN}$ T$_{NI}$ | −11° C. ~ 91° C. | −40° C. ~ 63° C. |

Figure 4:
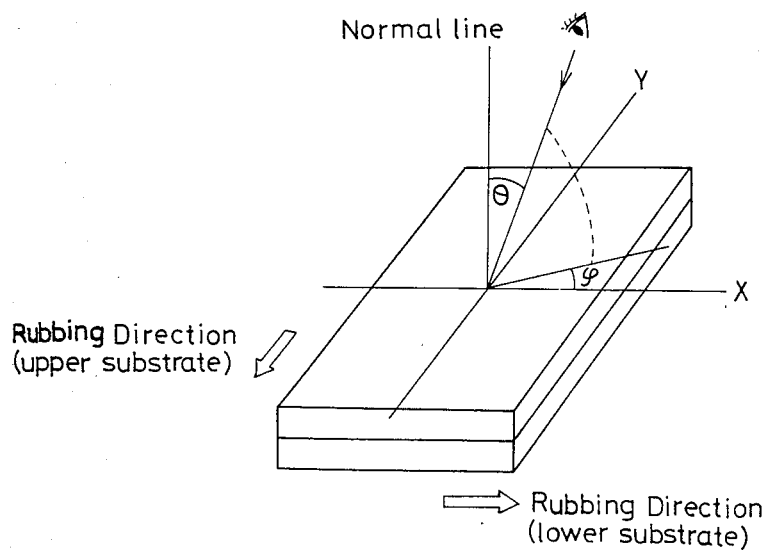
FIG. 4 is a diagram illustrating the definition of visual angle in the visual angle characteristics.
Figure 5:
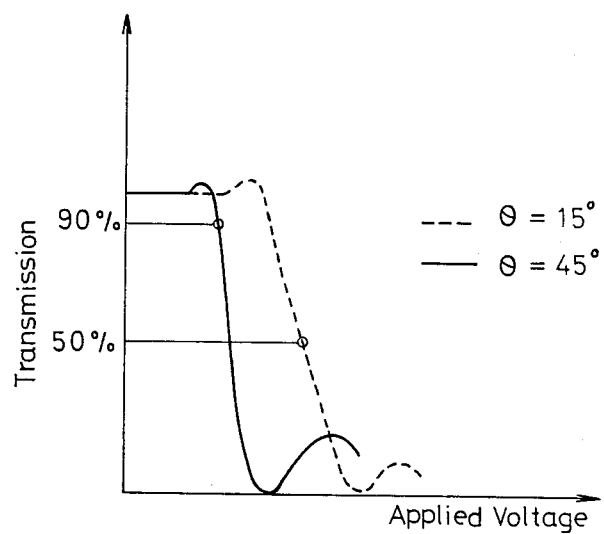
FIG. 5 is a diagram illustrating electric-optical characteristics of a liquid crystal composition.

[The numerical values given in the brackets indicated by the mark (*) have been compensated for a cell thickness of 10 μm. The measurements were performed at a fixed temperature of 25° C. V°$_{90}$ and V°$_{10}$ are the voltages which gave transmittances 90% and 10% respectively under the condition of transmittance-voltage characteristic satisfying φ (angle formed between the projection on the XY plane and the X axis)=45° and θ (angle formed between the direction of observation and the normal line)=45° in FIG. 4. The indication $\gamma^{15°,\ 50\%}_{45°,\ 90\%}$ represents the sharpness, which is defined as follows (refer to FIG. 5).

$$\gamma^{15°,\ 50\%}_{45°,\ 90\%} = \frac{V_{15°,\ 50\%}}{V_{45°,\ 90\%}} \qquad 5$$

(wherein V$_{15°,\ 50\%}$ stands for the voltage of transmittance of 50% where θ=15° and φ=45° and V$_{45°,\ 90\%}$ for the voltage of transmittance of 90% where O=45° and φ=45°).]

From the results given above, it is noted that the liquid crystal composition of the present invention showed the value of γ near the value of 1.20 which corresponds to N=32 in the formula ③ as compared with the conventional example. This fact suggests that the liquid crystal composition gives display of ample contrast when it is subjected to the multiplex drive under the condition of N (number of scanning electrodes)=32. Further, the liquid crystal composition of this example exhibited improvement in response characteristic.

Since the birefringence, Δn, in this example was fixed at a small value of about 0.10, the liquid crystal display panel formed by using this composition, when subjected to the multiplex drive under the condition of 1/32 duty, showed a relatively wide range of visual angle enough to give display of ample contrast.

Further, the composition retained its liquid crystal temperature range intact up to about 100° C. and, at the same time, exhibited a low T$_{CN}$ point particularly on the low temperature side and rendered the multiplex drive at low temperatures practicable.

Other working examples of this invention (Compositions 2 to 4) are shown in the following table.

| Liquid crystal compound | Composition 2 Percentage composition (wt %) | Composition 3 Percentage composition (wt %) | Composition 4 Percentage composition (wt %) |
|---|---|---|---|
| C$_3$H$_7$—(H)—(O)—OC$_2$H$_5$ | 10 | 15 | 10 |
| C$_3$H$_7$—(H)—(O)—OC$_4$H$_9$ | 10 | 10 | 9 |
| C$_3$H$_7$—(H)—(O)—CN | 10 | 15 | 10 |
| C$_5$H$_{11}$—(H)—(O)—CN | 10 | 15 | — |

-continued

| Liquid crystal compound | Composition 2 Percentage composition (wt %) | Composition 3 Percentage composition (wt %) | Composition 4 Percentage composition (wt %) |
|---|---|---|---|
| 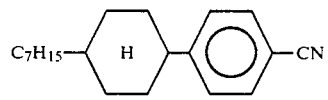 C$_7$H$_{15}$—H—⟨○⟩—CN | — | — | 5 |
| 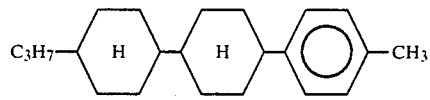 C$_3$H$_7$—H—H—⟨○⟩—CH$_3$ | — | 5 | 5 |
| 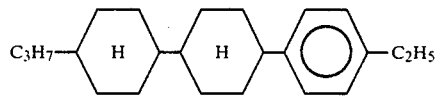 C$_3$H$_7$—H—H—⟨○⟩—C$_2$H$_5$ | 5 | — | — |
| 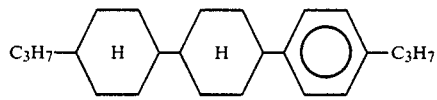 C$_3$H$_7$—H—H—⟨○⟩—C$_3$H$_7$ | — | — | 7 |
| 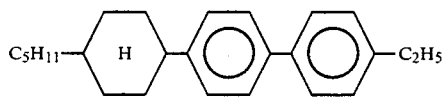 C$_5$H$_{11}$—H—⟨○⟩—⟨○⟩—C$_2$H$_5$ | — | 10 | 7 |
|  C$_5$H$_{11}$—H—⟨○⟩—⟨○⟩—H—C$_3$H$_7$ | 5 | — | 3 |
| 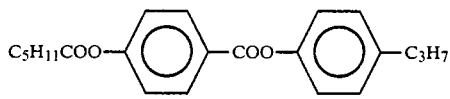 C$_5$H$_{11}$COO—⟨○⟩—COO—⟨○⟩—C$_3$H$_7$ | 13 | 8 | 10 |
| 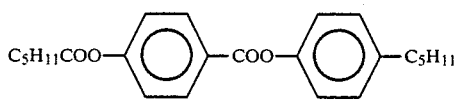 C$_5$H$_{11}$COO—⟨○⟩—COO—⟨○⟩—C$_5$H$_{11}$ | — | — | 10 |
| 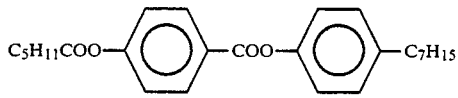 C$_5$H$_{11}$COO—⟨○⟩—COO—⟨○⟩—C$_7$H$_{15}$ | 12 | 7 | — |
| 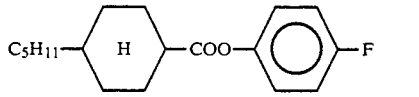 C$_5$H$_{11}$—H—COO—⟨○⟩—F | 13 | 8 | 12 |
| 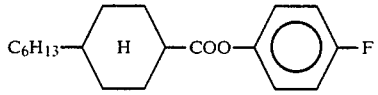 C$_6$H$_{13}$—H—COO—⟨○⟩—F | — | — | 12 |
| 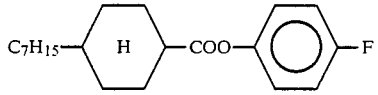 C$_7$H$_{15}$—H—COO—⟨○⟩—F | 12 | 7 | — |

The compositions given in the preceding table were capable of exhibiting the properties possessed by the composition 1 described above.

As described above, the liquid crystal composition contemplated by the present invention possesses an outstanding display property and, therefore, fully adapts itself to the complication of various display devices such as, for example, electronic desk-top computers and watches. The usefulness of the liquid crystal composition is particularly evident when the composition is used in liquid crystal televisions, graphic displays, etc.

Finally, the method for the construction of a liquid crystal television by the use of the liquid crystal composition of this invention will be described.

The liquid crystal television comprises a liquid crystal panel and a television drive circuit.

Figure 7:
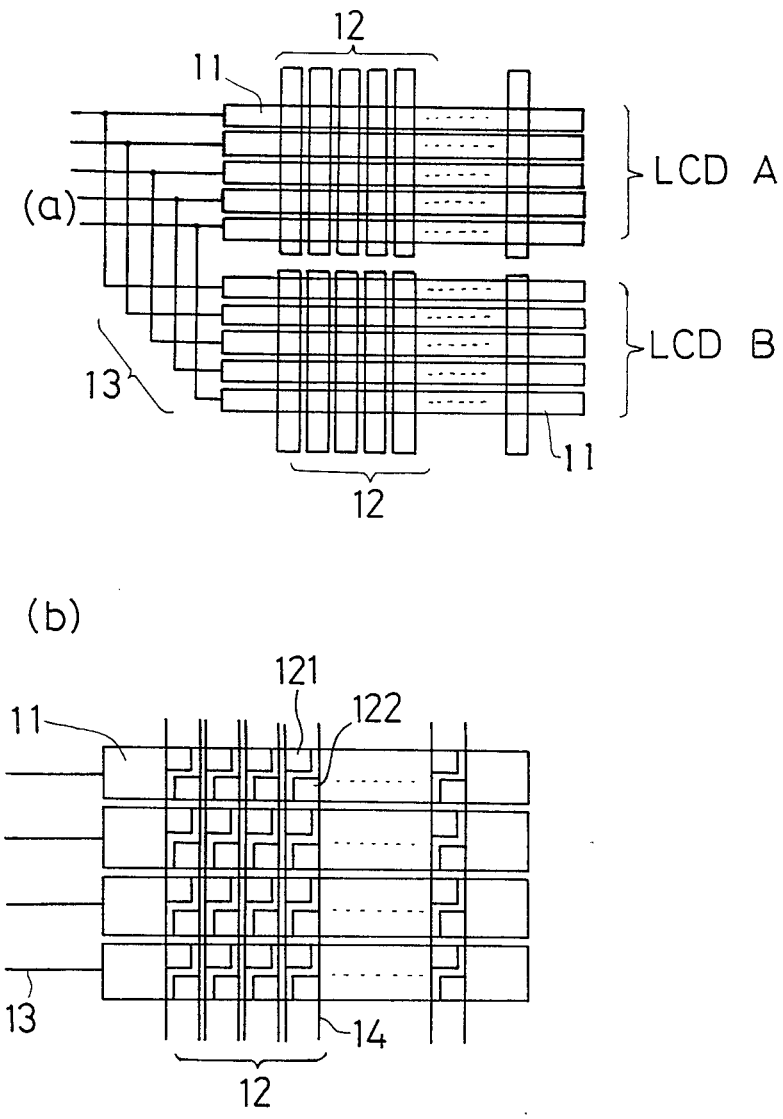

The liquid crystal panel equals the aforementioned TN panel in basic structure. Specifically, the structure of the liquid crystal panel is widely variable with the dissimilar modes of panel operation such as "single liquid crystal layer type," "double liquid crystal layer type," "vertical electrode division type," "multi-matrix electrode type," "simple matrix type," and various combinations thereof. An electrode structure combining the "single liquid crystal layer type," the "vertical electrode division type," and the "double matrix electrode type" is illustrated in FIG. 7. (In the diagram, (11) stands for scanning electrodes, (12) for a signal electrode section, (13) and (14) for outlet electrodes, and (121) and (122) for signal electrode units, respectively.)

Figure 8:
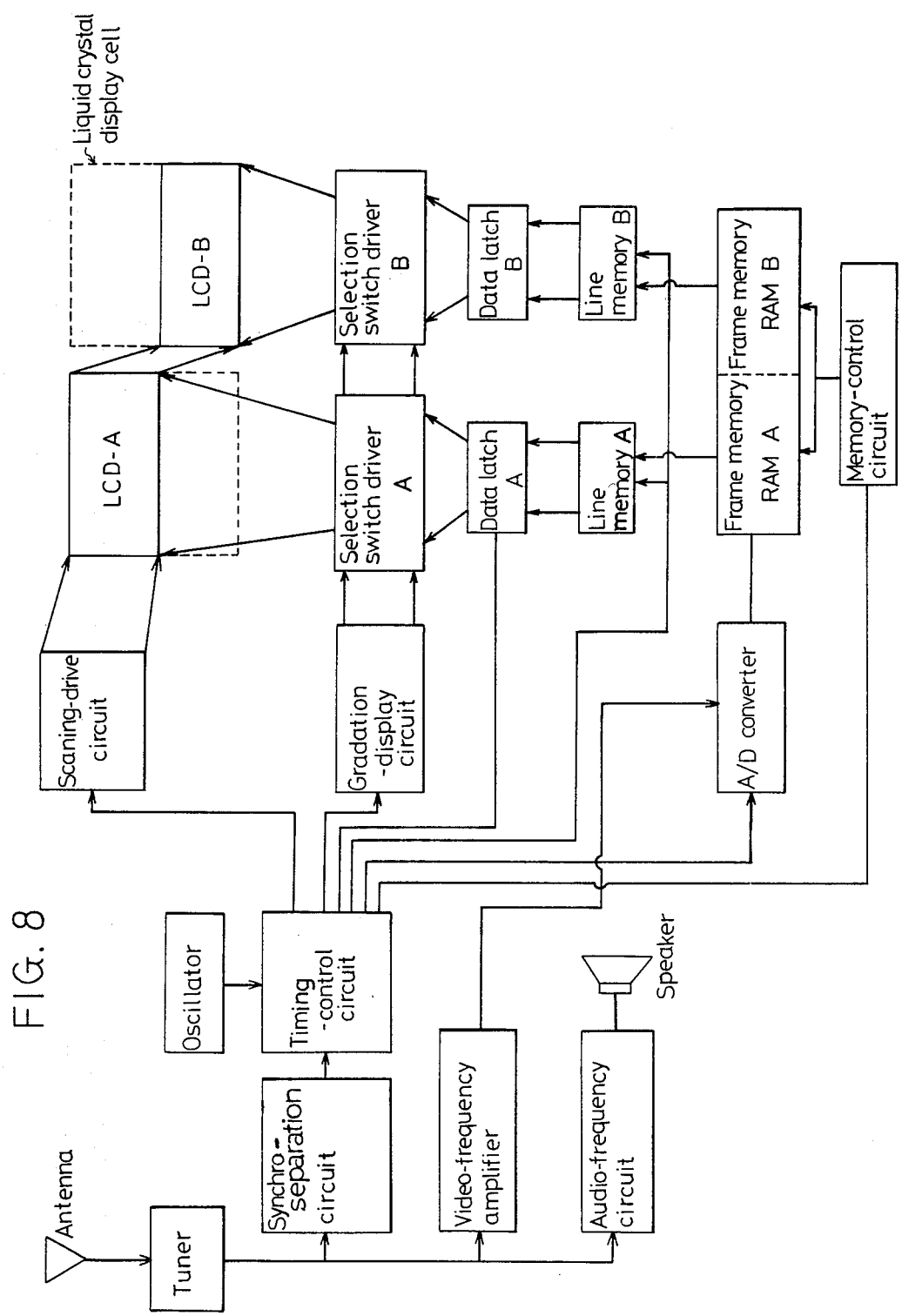
FIG. 8 is a diagram illustrating a system of circuits for a liquid crystal television.

The television drive circuit is formed of an A/D conversion circuit for converting image signals (analog signals) into corresponding digital signals, an electrode drive circuit for driving the liquid crystal panel by the optimized amplitude-selecting method, an audio circuit, etc. FIG. 8 illustrates a television drive circuit in the liquid crystal panel shown in FIG. 7.

The specification of the liquid crystal television embodying the present invention is shown below.

| Item | Description |
| --- | --- |
| Screen size | 2.5 inches (diagonal line) |
| Number of picture electrodes | 160 vertical lines (signal lines) |
| | 120 horizontal lines (scanning lines) |
| Glass size | 73.4 mm × 63.9 mm × 1 mm |
| | 47.6 mm × 75.0 mm × 1 mm |
| Pitch of picture electrodes | 0.32 mm |
| Thickness of liquid crystal layer | 5 μm |
| Structure of liquid crystal cell | Combination of vertical electrode division type, double matrix electrode type, and single liquid crystal layer type |
| Mode of display | Reflection of TN-FEM |
| Number of tones | 15 |
| Color of display | Monochrome |
| Duty ratio | 1/32 |

The liquid crystal panels using the conventional Ro-TN-403 (made by Roche), the conventional E-90 (made by BDH), and the liquid crystal composition (Liquid crystal composition 1 described above) were operated to produce television images thereon for comparison of display characteristics. It has been ascertained through visual inspection that the last liquid crystal panel surpassed the first two liquid crystal panels in response speed, display contrast, and range of visual angle. This means that the liquid crystal composition of the present invention is highly useful for the liquid crystal television which effects the halftone display.

(Composition of Ro-TN-403)

-continued

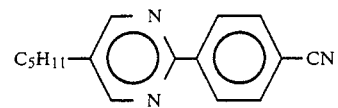

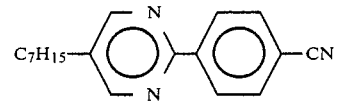

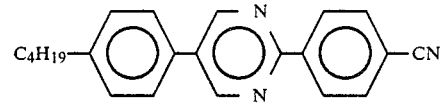

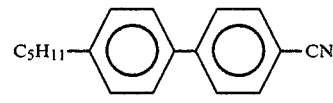

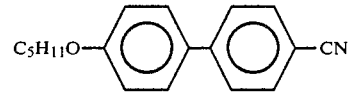

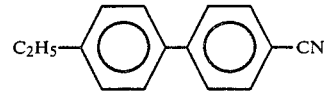

(Composition of E-90)

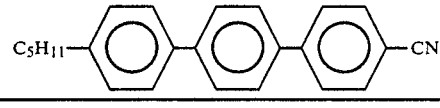

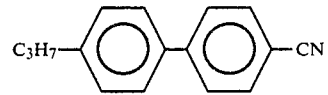

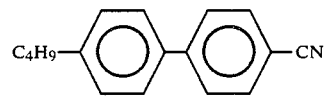

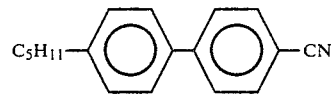

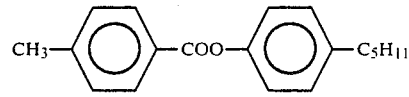

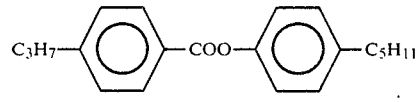

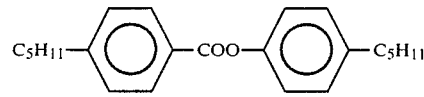

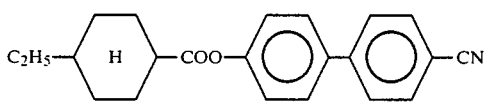

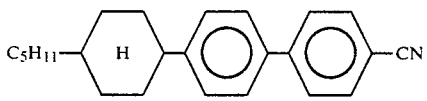

What we claim is:

1. A liquid crystal composition comprising a mixed phase of at least one compound of the general formula:

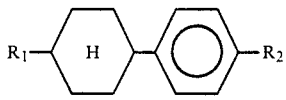
(A)

wherein $R_1$ is a saturated linear hydrocarbon group having 3 to 7 carbon atoms and $R_2$ is an ethoxy group, a propoxy group, or a butoxy group, at least one compound of the general formula:

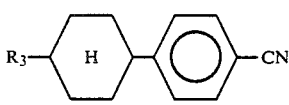
(B)

wherein $R_3$ is a saturated linear hydrocarbon group having 2 to 7 carbon atoms, at least one compound of the general formula:

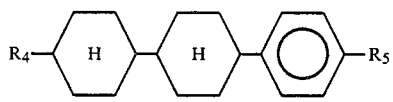
(C)

wherein $R_4$ is a saturated linear hydrocarbon group having 2 to 5 carbon atoms and $R_5$ is a saturated linear hydrocarbon group having 1 to 3 carbon atoms, at least one compound of the general formula:

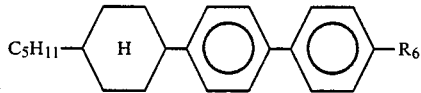
(D)

wherein $R_6$ is an ethyl group or a group of the formula

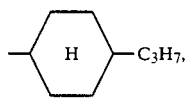

said compounds of the general formulas (A), (B), (C) and (D) being present in an amount totalling from 50-70 w/w%, at least one compound of the general formula:

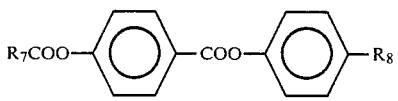
(E)

wherein $R_7$ is a saturated linear hydrocarbon group having 4 to 6 carbon atoms and $R_8$ is a saturated linear hydrocarbon group having 3 to 7 carbon atoms and being present in an amount of from 15-25 w/w%, and at least one compound of the general formula:

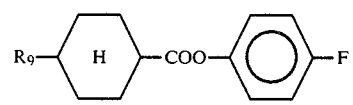
(F)

wherein $R_9$ is a saturated linear hydrocarbon group having 4 to 8 carbon atoms and being present in an amount of from 15-25 w/w%.

2. A liquid crystal composition of claim 1, wherein the at least one compound of the formula (B) is incorporated in an amount of from 15 to 30 w/w%.

3. A liquid crystal composition of claim 1, wherein the at least one compound of the formula (A) is incorporated in an amount of from 15-25 w/w%.

4. A liquid crystal composition of claim 1, wherein the compounds of the general formulas (C) and (D) are present in an amount totalling from 10-25 w/w%.

5. A liquid crystal composition of claim 1 which is a mixed phase of the compounds:

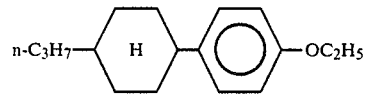

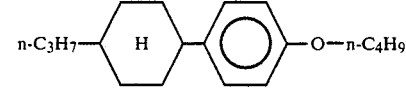

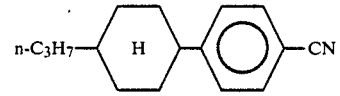

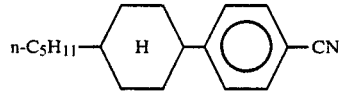

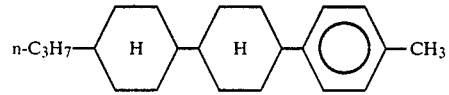

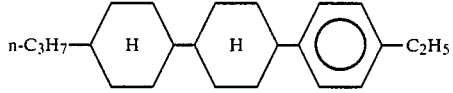

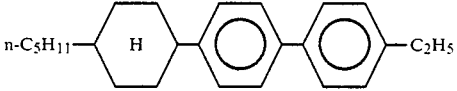

-continued

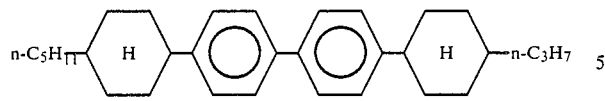

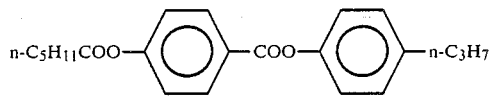

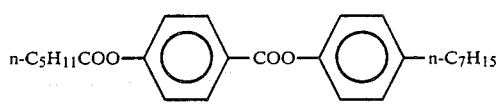

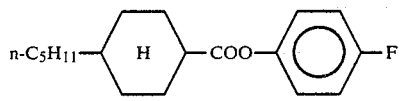

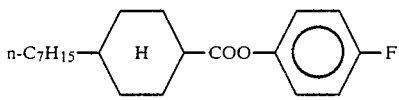

6. A liquid crystal composition of claim 1, wherein at least one compound of the general formula (A) is present in an amount of not less than 10 w/w% and at least one compound of formula (B) is present in an amount of not less than 10 w/w%.

7. A liquid crystal composition of either claim 1 or 6, wherein the compounds of the general formulas (C) and (D) are present in an amount totalling not less than 10 w/w%.

8. In a multiplex twisted nematic liquid crystal display, the improvement comprising the use of the liquid crystal composition of any of claims 1, 2, 3, 4, 5, or 6.

9. A liquid crystal display device of claim 12 for use in a liquid crystal television device.

* * * * *